US012292979B2

(12) United States Patent
Dvorkin et al.

(10) Patent No.: US 12,292,979 B2
(45) Date of Patent: May 6, 2025

(54) FABRIC-BASED ROOT-OF-TRUST (71) Applicant: Cisco Technology, Inc., San Jose, CA (US)

(72) Inventors: Mike Dvorkin, Redwood City, CA (US); Chakradhar Kar, San Jose, CA (US); Ayan Banerjee, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 241 days.

(21) Appl. No.: 18/051,167

(22) Filed: Oct. 31, 2022

(65) Prior Publication Data
US 2024/0143773 A1 May 2, 2024

(51) Int. Cl.
G06F 21/57 (2013.01)

(52) U.S. Cl.
CPC ...... G06F 21/575 (2013.01); *G06F 2221/034* (2013.01)

(58) Field of Classification Search
CPC ............... G06F 21/575; G06F 11/2247; G06F 2212/177; G06F 2221/034
USPC .......................................................... 726/22
See application file for complete search history.

(56) References Cited

U.S. PATENT DOCUMENTS

| 9,165,143 | B1* | 10/2015 | Sanders | G06F 21/575 |
| 9,210,140 | B2* | 12/2015 | Pope | G06F 21/572 |
| 2009/0217374 | A1* | 8/2009 | Liu | G06F 21/85 726/19 |
| 2011/0202983 | A1* | 8/2011 | Pope | H04L 41/28 726/7 |
| 2017/0109531 | A1 | 4/2017 | Wag et al. | |
| 2017/0214694 | A1 | 7/2017 | Yan | |
| 2018/0196945 | A1 | 7/2018 | Kornegay et al. | |
| 2018/0204007 | A1* | 7/2018 | Rangayyan | G06F 21/575 |
| 2020/0042710 | A1 | 2/2020 | Liu | |
| 2020/0202004 | A1 | 6/2020 | Montero et al. | |
| 2021/0342169 | A1 | 11/2021 | Heinrich | |

(Continued)

FOREIGN PATENT DOCUMENTS

WO 2018227042 A1 12/2018

OTHER PUBLICATIONS

Anonymous: "Verizon NetworkInfrastructure Planning SbN-NFV Reference Architecture", Feb. 2016 (Feb. 2016), XP055695763,Retrieved from the Internet:URL:https://m.iotone.com/files/pdf/vendor/Verizon_SDN-NFV_Reference_Architecture.pdf[retrieved on May 15, 2020]Clauses 3-5 and 21, 220 pages.

(Continued)

*Primary Examiner* — Teshome Hailu
(74) *Attorney, Agent, or Firm* — Lee & Hayes, P.C.

(57) ABSTRACT

A method of creating a root-of-trust (RoT) within a network fabric may include powering on a network interface card (NIC) baseboard management controller (BMC) (NIC BMC), booting up a NIC via the NIC BMC, obtaining an address for the NIC, verifying an identity of the NIC at a fabric trust identity server using a key obtained from a secure vault communicatively coupled to the NIC BMC, verifying with the fabric trust identity server a number of images of a host device residing in the NIC based at least in part on the identity of the NIC being verified, and instructing a platform BMC to boot up the host device based at least in part on the number of images of the host device being verified.

20 Claims, 7 Drawing Sheets (56) References Cited

U.S. PATENT DOCUMENTS

2022/0043914 A1 2/2022 Edwards
2022/0103490 A1* 3/2022 Kim ..................... G06F 3/0641

OTHER PUBLICATIONS

PCT Search Report and Written Opinion mailed Feb. 13, 2024 for PCT Application No. PCT/US2023/076995 from PCT Summary, 34 pages.

* cited by examiner

FABRIC-BASED ROOT-OF-TRUST

TECHNICAL FIELD

The present disclosure relates generally to computer network security. Specifically, the present disclosure relates to systems and methods for creating a fabric-based root-of-trust that provides a trust zone environment for compute and network elements.

BACKGROUND

Computing and computing networks have become ubiquitous throughout the world. In most instances, a network may be secured in order to ensure that proprietary or private information is not compromised. Further, computer applications are transitioning from monolithic architectures including a unified model composed all in one piece for the design of a software program to distributed microservices. Thus, computing environments no longer include a set of specialized servers, but, instead, a hive of highly interconnected stateless machines. These interconnected hives may be referred to as a computing fabric. During this transition, the security and trust models for devices within and accessing the computing fabric are evolving away from a singleton, server-centric implementation towards a collective distributed fabric root-of-trust (RoT). Identity management solutions may enable automated provisioning, updates, and de-provisioning of devices. However, these identity management solutions do not account for the unmet need for using the machine identity to enable a collective trust zone environment.

RoT for an x86-based host server may be associated only be associated with the x86 host server. Although an x86-based host server may be used as an example of a server, the same issues also apply to advanced reduced instruction set computer (RISC) machines (ARM)-based host servers. A host server functioning as the RoT itself may be viewed as the weakest link in a zero trust environment where devices are not trusted by default (e.g., never trust, always verify). This makes a network employing a host server as the RoT an unacceptable architecture for modern fabric computing and distributed cloud networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Computer networks may include a number of switches, routers, endpoint computing devices, compute elements, and virtual computing devices, among a myriad of other types of computing and network devices. In the case of compute elements and virtual computing devices, compute images associated with these devices may be installed by a server device under the control of a server administrator. Further, the overall network may be administered by a network administrator. As to the security of the network, the server devices, and the other types of computing and network devices, rogue or malicious software such as applications may be introduced into the computer network via a server device or other computing device. When this occurs, the malicious software may be introduced via a server device and compromise the operation of the network and computing devices and/or allow the malicious software to access sensitive information.

Thus, the present systems and methods provide for a fabric-based approach of increasing the strength of a root-of-trust (RoT). Between any two peers within the computer network, a pair of keys may be stored within the peers and used to verify that a computing device is a genuine device that should be given access to the network and its services. Using the present systems and methods, any server device may be trusted vis-a-vis the fabric layer of the network comprising, for example, the switches and routers. Thus, the RoT may be extended to the edges of the fabric of the computer network.

Overview

A method of moving the RoT of a host from the host such as an x86 server or an advanced reduced instruction set computer (RISC) machine (ARM) to a network fabric, may include establishing a trust, by a network interface card (NIC), with a trust authority in the network fabric. The NIC may include a smart NIC (SNIC). Further, the network fabric may include a management fabric, a data fabric, or other type of network fabric. The SNIC may serve as a conduit for the corresponding host and an operating system (OS) or other application hosted by the network fabric.

Additionally, the techniques described in this disclosure may be performed as a method and/or by a system having non-transitory computer-readable media storing computer-executable instructions that, when executed by one or more processors, performs the techniques described above.

Example Embodiments

In the examples described herein, a root-of trust (RoT) may be moved from a host computing device such as, for example, a number of compute servers to an underlying ubiquitous networking fabric. In this manner, a network may utilize a fabric-based RoT providing a trust zone environment for the compute and network elements within the network. In many instances, vendors such as, for example, cloud computing and virtualization services do not own the network. Thus, in order to achieve the same level of security proposition, these vendors may require strong partnerships with other network vendors. The present system and methods create a more cohesive bond between a number of compute servers and a networking switch associated with the compute servers. This can greatly benefit the security of an on-premises data center, for example.

A method of moving the RoT of a host from the host such as an x86 server or an advanced reduced instruction set computer (RISC) machine (ARM) to a network fabric, may include establishing a trust, by a network interface card (NIC), with a trust authority in the network fabric. The NIC may include a smart NIC (SNIC). Further, the network fabric may include a management fabric, a data fabric, or other type of network fabric. The SNIC may serve as a conduit for the corresponding host and an operating system (OS) or other application hosted by the network fabric.

The methods and systems described herein may further include partitioning the secure vault of the SNIC into multiple security domains. These multiple security domains may include, for example, an ARM trust zone domain, an ARM core domain, an x86 infrastructure domain, and a user domain. The SNIC may further include a secure vault 106. Each security domain my be implemented by a disjoint set of hardware components. Further, each domain may provide a separate hardware electronic fuse (eFuse) programming and a number of buses may be connected to each domain.

A platform baseboard management controller (BMC) and a SNIC BMC may be powered up where the SNIC BMC is used to control the power up of x86 or arm server via platform BMC. The SNIC BMC is the unit that controls the power up sequence on the host device (e.g., an x86 server). The host device is in a reset state unless instructed by the SNIC BMC to boot up. The duration of the reset state allows the SNIC BMC to boot up its associated NIC (e.g., a SNIC). Further, the duration of the reset state allows ensures that the RoT is established, allows for determination of an appropriate image for booting the host device, and allows the host device to boot up.

The SNIC BMC may power up its own data processing units (DPUs) (e.g., ARM cores). In doing so, the SNIC BMC may verify whether the factory installed SNIC ARM trust zone firmware (FW) has not been tampered.

Further, the present systems and methods may include booting up an ARM trust zone securely and verifying the NIC software and firmware using a key stored inside the vault. A dynamic host configuration protocol (DHCP) request may be sent, by a SNIC DPU, to a fabric controller to obtain an Internet Protocol (IP) address.

The present systems and methods allow, via the admission control, the SNIC to act as a proxy for the host device and makes the host device eligible to be part of the network fabric. The SNIC may send a challenge request to identify a fabric trust identity server to validate its identity, once the IP address or IPv6 address is assigned to the NIC. Further, the NIC may update and attest the host device firmware and software. The fabric trust identity server may validate the identity of the host device. The fabric trust identity server may be included in a fabric controller.

The present systems and methods may further include collecting an inventory of field replaceable units (FRUs) in a server stack by the SNIC ARM cores and verifying them with the fabric trust identity. The SNIC BMC may be requested to and instruct to power on the host device (e.g., the x86 server) by the SNIC ARM cores. The SNIC BMC may in turn request the platform BMC to turn on the host device. The host device may be booted from an embedded multimedia card (eMMC) flash device once the 12v power of the host device is turned on.

In one example, the systems and methods may include verifying and attesting any other software installed (e.g., in case of update) by the fabric trust identity. This may include an attestation that may be done for all future FRU installations. Further, the systems and methods may include exchanging periodic authentication messages between the SNIC BMC and the platform BMC in order to ensure that tampering via hot-plug or some other means has not occurred.

Examples described herein provide a method of creating a root-of-trust (RoT) within a network fabric. The method may include powering on a network interface card (NIC) baseboard management controller (BMC) (NIC BMC) and booting up a NIC via the NIC BMC. The method may further include obtaining an internet protocol (IP) address or an IPv6 address for the NIC, verifying an identity of the NIC at a fabric trust identity server using a key obtained from a secure vault communicatively coupled to the NIC BMC and trust zone secure processor, and verifying with the fabric trust identity server a number of images of a host device residing in the NIC based at least in part on the identity of the NIC being verified. The method may further include instructing a platform BMC to boot up the host device based at least in part on the number of images of the host device being verified.

The method may further include authenticating the NIC as to an advanced reduced instruction set computer (RISC) machine (ARM) using the key obtained from the secure vault communicatively coupled to the NIC BMC. The method may further include instructing the NIC, with the NIC BMC, to boot up a number of ARM cores associated with the ARM. The method may further include provisioning the number of images of the host device to the platform BMC for execution on the host device.

The vault may include a System-on-Chip (SoC) electrical programmable fuse (eFuse). The keys of the secure vault may be secured within the secure vault at a time of manufacture. The platform BMC maintains the host device in a reset state until the NIC BMC instructs the platform BMC to boot up the host device. The method may further include periodically exchanging an authentication message between the NIC BMC and the platform BMC to ensure that tampering of the platform BMC has not occurred.

Examples described herein also provide a non-transitory computer-readable medium storing instructions that, when executed, causes a processor to perform operations, may include powering on a network interface card (NIC) baseboard management controller (BMC) (NIC BMC) and booting up a NIC via the NIC BMC. The operations may further include obtaining an internet protocol (IP) address or an IPv6 address for the NIC, verifying an identity of the NIC at a fabric trust identity server using a key obtained from a secure vault communicatively coupled to the NIC BMC and trust zone secure processor, and verifying with the fabric trust identity server a number of images of a host device residing in the NIC based at least in part on the identity of the NIC being verified. The operations may further include instructing a platform BMC to boot up the host device based at least in part on the number of images of the host device being verified.

The operations may further include authenticating the NIC as to an advanced reduced instruction set computer (RISC) machine (ARM) using the key obtained from the secure vault communicatively coupled to the NIC BMC. The operations may further include instructing the NIC, with the NIC BMC, to boot up a number of ARM cores associated with the ARM. The operations may further include provisioning the number of images of the host device to the platform BMC for execution on the host device. The vault may include a System-on-Chip (SoC) electrical programmable fuse (eFuse). The keys of the secure vault may be secured within the secure vault at a time of manufacture. The platform BMC may maintain the host device in a reset state until the NIC BMC instructs the platform BMC to boot up the host device. The operations may further include periodically exchanging an authentication message between the NIC BMC and the platform BMC to ensure that tampering of the platform BMC has not occurred.

Examples described herein also provide a computing device may include a processor and a non-transitory computer-readable media storing instructions that, when executed by the processor, causes the processor to perform a number of operations. The operations may include powering on a network interface card (NIC) baseboard management controller (BMC) (NIC BMC) and booting up a NIC via the NIC BMC. The operations may further include obtaining an internet protocol (IP) address or an IPv6 address for the NIC, verifying an identity of the NIC at a fabric trust identity server using a key obtained from a secure vault communicatively coupled to the NIC BMC, and verifying with the fabric trust identity server a number of images of a host device residing in the NIC based at least in part on the identity of the NIC being verified. The operations may further include instructing a platform BMC to boot up the host device based at least in part on the number of images of the host device being verified.

The operations may further include authenticating the NIC as to an advanced reduced instruction set computer (RISC) machine (ARM) using the key obtained from the secure vault communicatively coupled to the NIC BMC, instructing the NIC, with the NIC BMC, to boot up a number of ARM cores associated with the ARM, and provisioning the number of images of the host device to the platform BMC for execution on the host device.

The NIC may include a smart NIC (SNIC). The operations may further include periodically exchanging an authentication message between the NIC BMC and the platform BMC to ensure that tampering of the platform BMC has not occurred.

Figure 1:
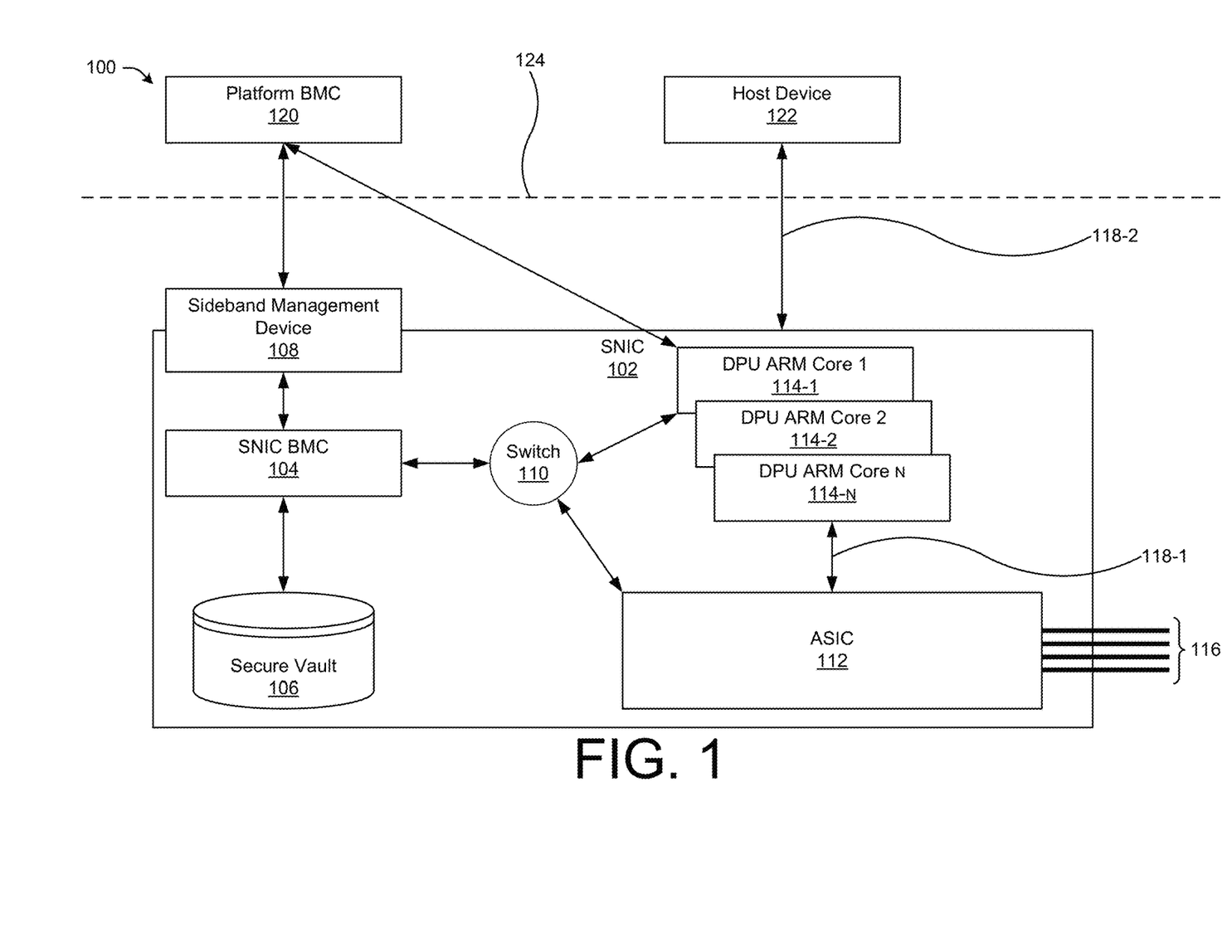
FIG. 1 illustrates a system-architecture diagram of a network that utilizes a network interface card (NIC) baseboard management controller (BMC) (NIC BMC), according to an example of the principles described herein.

Turning now to the figures, FIG. 1 illustrates a system-architecture diagram of a network fabric 100 that utilizes a network interface card (NIC) baseboard management controller (BMC) (NIC BMC), according to an example of the principles described herein. The NIC BMC may be included as part of a NIC and may be used to create a Root-of-Trust (RoT) within a network fabric instead of a host device such as an x86 server or an advanced reduced instruction set computer (RISC) machine (ARM). In other words, the present systems and methods describe moving the RoT of a host device from the host device (e.g., a x86 server or ARM) to a network fabric.

As depicted in FIG. 1, a smart NIC (SNIC) 102 may be included within the host device 122, a network device coupled to the host device 122, a network controller or orchestrator, a router, a switch, or other device capable of controlling the powering on and/or booting up of the host device 122. Line 124 demarks a separation between the SNIC 102 and the host device 122 in order to emphasize the roles each play in the present systems and methods. Thus, line 124 indicates that the SNIC 102 may operate independent of the host device 122 and may control at least a portion of the operation of the host device 122. The host device 122 may include, for example, any server computing device that provides functionality and services to a number of client devices within the network fabric 100. The host device 122 may include any computing resources to the network such as data processing, data storage, and resource sharing among the client devices within the network fabric 100, among other services. As used in the present specification and in the appended claims, the term 'fabric" means any mesh of connections between network devices within the network fabric 100 such as, for example, access points, switches, routers that transports data to a destination, client devices, and other computing devices.

A platform BMC 120 may be directly or indirectly communicatively coupled to the SNIC 102 and/or the host device 122. The platform BMC 120 may include any controller included in, for example, a mother board of the host device 122 and may manage an interface between system-management software and platform hardware in order to perform a number of basic management functions. One of the basic management functions the platform BMC 120 provides to the host device 122 includes power cycling including powering on and/or booting up the host device 122. The platform BMC 120 may be used to manage the host device 122, but in this process a machine identity used to enable a collective trust zone environment cannot be obtained. In other words, a RoT attached to the host device 122 is the weakest link in a zero trust environment, making this type of relationship an unacceptable architecture in fabric computing and distributed cloud applications.

As computer applications are transitioning from monolithic architectures to distributed microservices, the computing environments are no longer just a set of specialized servers, but include, instead, a hive of highly interconnected stateless machines referred to herein as a computing fabric. As these monolithic architectures to distributed microservices, evolve away from a singleton, security and trust models transition from a server-centric implementation towards a collective distributed fabric RoT. Device identity management solutions may advantageously enable automated provisioning, updates, and de-provisioning of devices within the network fabric 100. The unmet need for using the machine identity to enable a collective trust zone environment is lacking in these computer architectures. In some monolithic architectures, a RoT for an x86 host (e.g., the host device 122) may be attached to the host device 122 only. In this example, an x86 server device is being used generically for a server device. However, the same issues apply to advanced reduced instruction set computer (RISC) machine (ARM)-based machines as well. Thus, a host device 122 being the RoT itself is the weakest link in the zero trust environment, making it an unacceptable architecture for modern fabric computing and distributed cloud worlds. The present systems and methods move the ROT of the host from the x86 server device to the underlying ubiquitous networking fabric. The SNIC 102 serves to accomplish this objective through use of a SNIC BMC 104 to boot up the SNIC 102, ensure that RoT is established, identify, or determine an appropriate image for the host device 122 to boot with, and allow for the host device 122 to boot up, along with other processes described herein. More details regarding these and other processes are described herein.

The SNIC 102 may include any network interface card (NIC) that allows for the host device 122 and other computing devices to connect to the network fabric 100 and provide communication between the computing devices within the network fabric 100. However, the SNIC 102 may further include any hardware and/or software that may be used to provide the processes and methods described herein such as, for example, a processor (e.g., a multi-core central processing unit (CPU)), a number of data storage device(s), data packet transmission devices, graphics processing unit(s) (GPUs), and field-programmable gate arrays (FPGAs), among other computing elements. The SNIC 102 may further perform any of encryption/decryption, firewall processing, transmission control protocol/internet protocol (TCP/IP) and hypertext transfer protocol (HTTP) processing, virtualization, load balancing, and data path optimization. In contrast, a basic NIC may only facilitate communication between computing devices on a network, are not intelligent enough to perform other functions, and are only intelligent enough to offload functions from a processing device of a host system. Thus, the SNIC 102 is capable of significantly more relative to a basic NIC.

In one example, the SNIC 102 may include a switch 110 such as a gigabyte (GB) scale switch. Further, an application specific integrated circuit (ASIC) may be included in the SNIC 102 that may be customized to perform one or more of the processes described herein. The ASIC may include a number of input communication lines 116 to allow for in-band communication with the ASIC 112 of the SNIC 102. A sideband management device 108 may also be included in the SNIC 102 to provide for out-of-band communications to be received. In one example, the in-band and out-of-band communications may include management flows that allow for the elements of the SNIC 102 to be managed. Further, the in-band and out-of-band communications may include traffic flows that include data packets to be processed by the SNIC 102 and/or the host device 122.

The SNIC 102 may further include a number of data processing unit (DPU) ARM cores 114-1, 114-2, . . . 114-N, where N is any integer greater than or equal to 1 (collectively referred to herein as DPU ARM core(s) 114 unless specifically addressed otherwise). In one example, the DPU ARM cores 114 may execute a LINUX kernel. Further, the DPU ARM cores 114 may be used to execute an image for the host device 122 based on an appropriate image identified by the SNIC BMC 104. In one example, the DPU ARM cores 114 may include the BLUEFIELD-3 DPU developed and distributed by Nvidia Corporation.

The SNIC 102 may further include a secure vault 106. The secure vault 106 may store a number of keys that may be used to verify the SNIC 102 as to the network fabric 100, verify software and/or firmware of the SNIC 102, the DPU ARM cores 114, the ASIC 112, and/or the host device 122, obtain an IP address or an IPv6 address for the SNIC 102, and perform other security-related processing. In one example, the SNIC BMC 104 may verify the SNIC 102 firmware. The SNIC BMC 104 has access to the secure vault 106 in order to perform these functions. In one example, the keys of the secure vault 106 may be secured within the secure vault 106 at a time of manufacture of the SNIC 102 in order to avoid any potential for the keys being compromised.

The ASIC 112 may be communicatively coupled to at least one of the DPU ARM cores 114 via, for example, a first peripheral component interconnect express (PCIe) interface 118-1. Similarly, the host device 122 may be communicatively coupled to the SNIC 102 and/or at least one of the DPU ARM cores 114 via a second PCIe interface 118-2. Even though the examples described herein utilize PCIE (e.g., PCIE Generation 5) among other communication interfaces, this communication interface may include, for example, compute express link (CXL).

The platform BMC 120 may be communicatively coupled to at least one of the DPU ARM cores 114 of the SNIC 102 directly via a first communication channel and/or indirectly via the sideband management device 108, SNIC BMC 104, and switch 110. The switch 110 may be communicatively coupled to the SNIC BMC 104, a at least one of the DPU ARM cores 114, and the ASIC 112. Further, the SNIC BMC 104 is communicatively coupled to the sideband management device 108 and the secure vault 106.

To accommodate the requirements of a new network fabric 100 computing architecture, the present systems and methods move the RoT of the host device 122 from x86 to the underlying ubiquitous networking fabric 100. The network fabric 100 may be presumed to have a level of trust between devices within the network fabric 100, where adjacency associations are predicated on the peers being able to certify each other. The host device 100 may be authenticated by the network fabric 100 using the SNIC 102 before the host device 122 is allowed to access the network fabric 100. Also, with this approach any and every field replaceable unit (FRU) may be authenticated by the network fabric 100, and any runtime installable software may be authenticated. The SNIC 102 establishes the RoT with the network fabric 100 before the host device 122 (e.g., an x86 server) is powered on and in an automated way images the host device 122 without involving the host device 122. The SNIC 102 provides a trusted secure enclave including a level of trust established with the network fabric 100 for the security and trust functions executed on behalf of the network fabric 100. The RoT may be initiated in the management plane or may be deployed in the data plane. Thus, in the examples described herein, the definition of the network fabric 100 may include either a production fabric or a management fabric or a combination of both. As used in the present specification and in the appended claims, the term "data plane" is meant to be understood broadly as any function or process that forwards data packets form one device to another. As used in the present specification and in the appended claims, the term "control plane" is meant to be understood broadly as any function or process that determines which path to use when transmitting data including through the use of routing protocols. Further, as used in the present specification and in the appended claims, the term "management plane" is meant to be understood broadly as any function or process that are used to control and monitor devices within the network.

Trust authority is the RoT of the entire system. The trust authority may reside within the data/production fabric in a situation where all management and administration activities are performed in-band (e.g., via the input communication lines 116), or in the management fabric in a situation where all management and administration activities are performed out-of-band (e.g., via the sideband management device 108). In the latter case, the data fabric establishes trust with a trust authority within the management fabric. Once the trust is established, the data fabric may serve as a conduit on behalf of the trust authority. Likewise, the SNIC 102 may establish trust with the trust authority in the network fabric 100 (management or data) and may serve as a conduit for the corresponding host device 122 and the operating system (OS)/applications hosted.

In one example, the network fabric 100 may include a plurality of SNICs 102. In this case, multiple SNICs 102 may be associated with the host device 122 (e.g., server/host), trust may be established in an equivalent manner as described herein on all these devices. However, for simplicity, the present disclosure will describe the interaction between a single host device 122 and a single SNIC 102. With the understanding of the functionality and interconnectivity of the various elements of the SNIC 102, platform BMC 120, and host device 122, the process by which the RoT is secured by the network fabric 100 will now be described.

Figure 2:
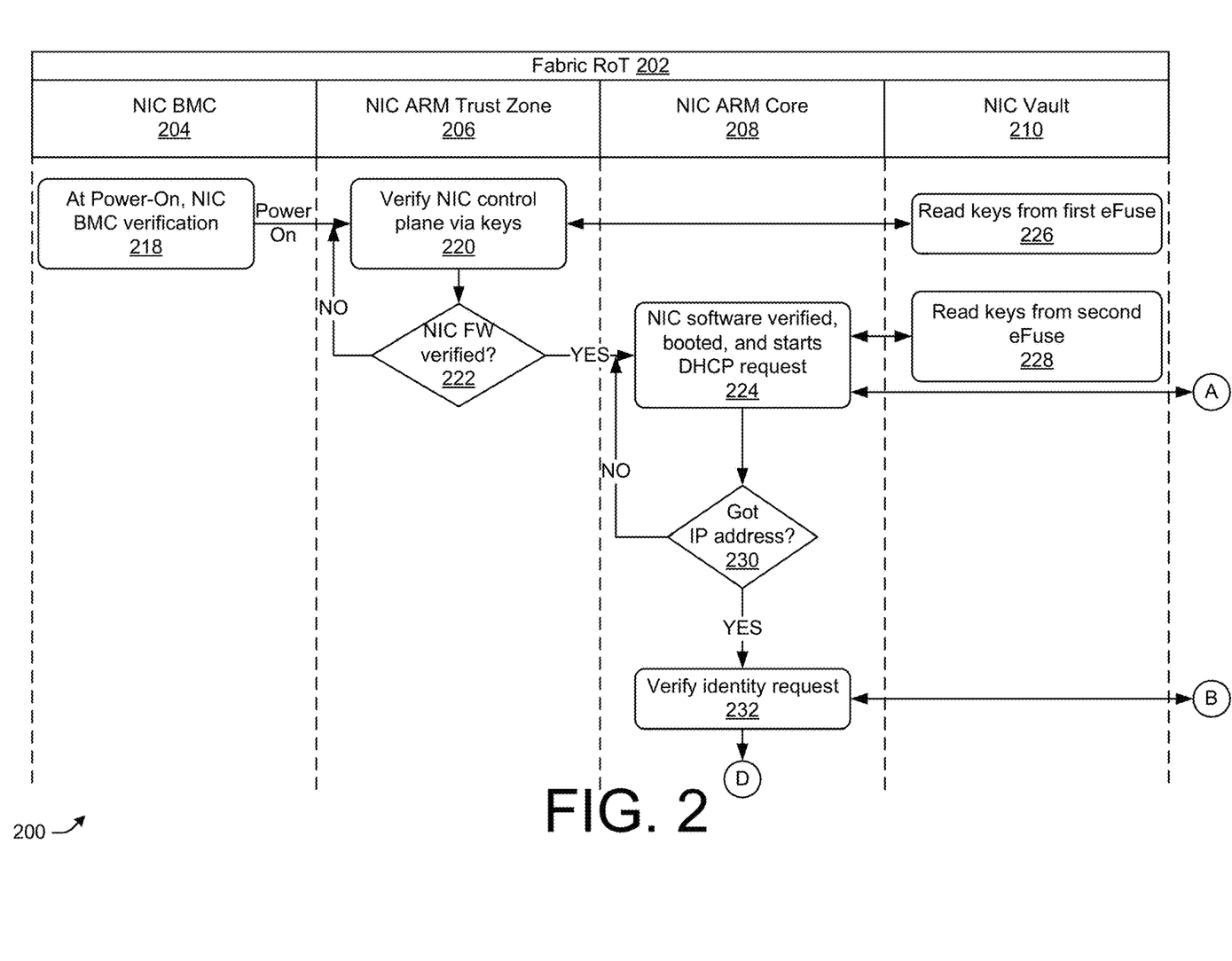
FIGS. 2 through 4 illustrates a flow diagram of an example method of creating a root-of-trust (RoT) within a network fabric, according to an example of the principles described herein.
Figure 3:
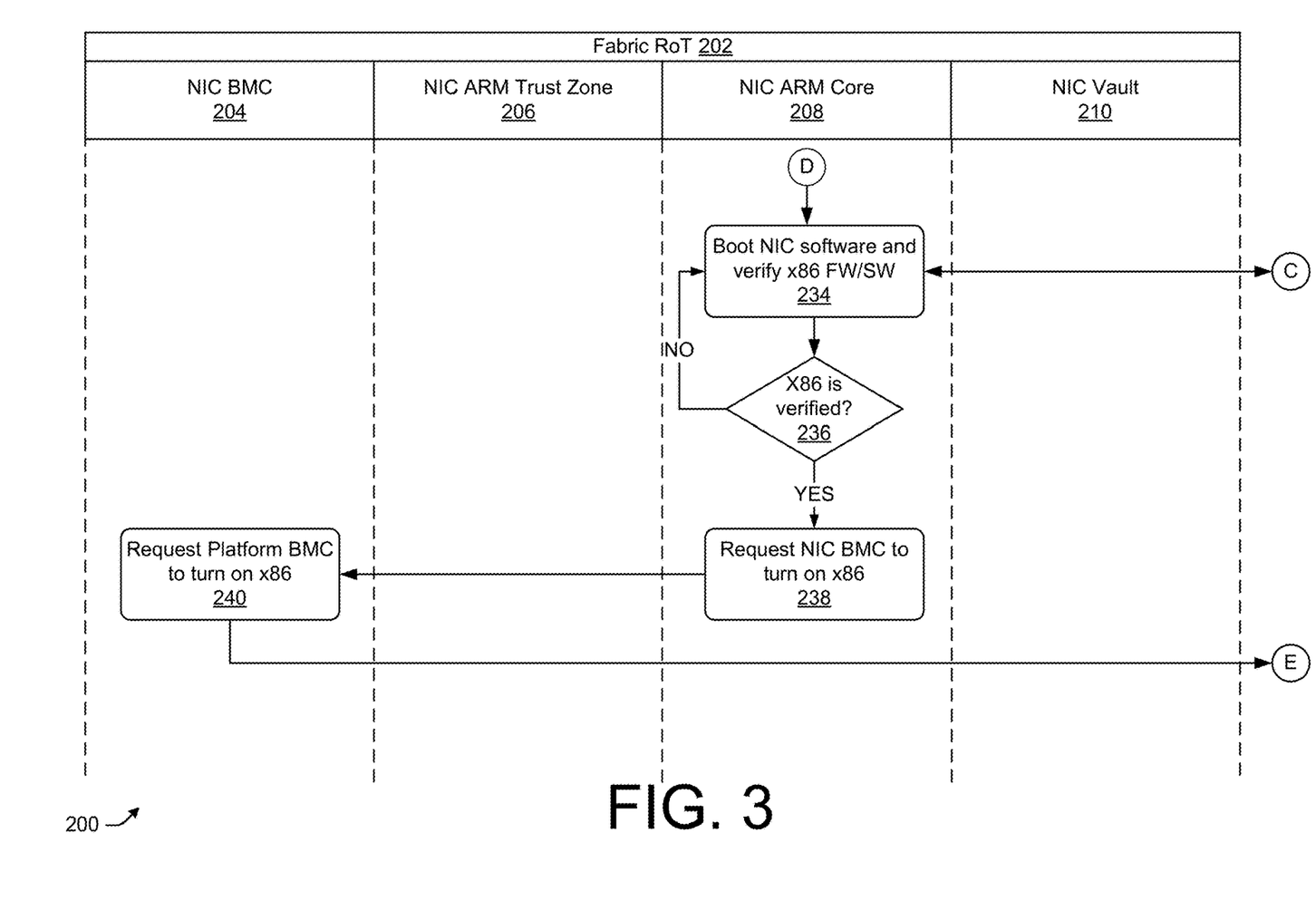
Figure 4:
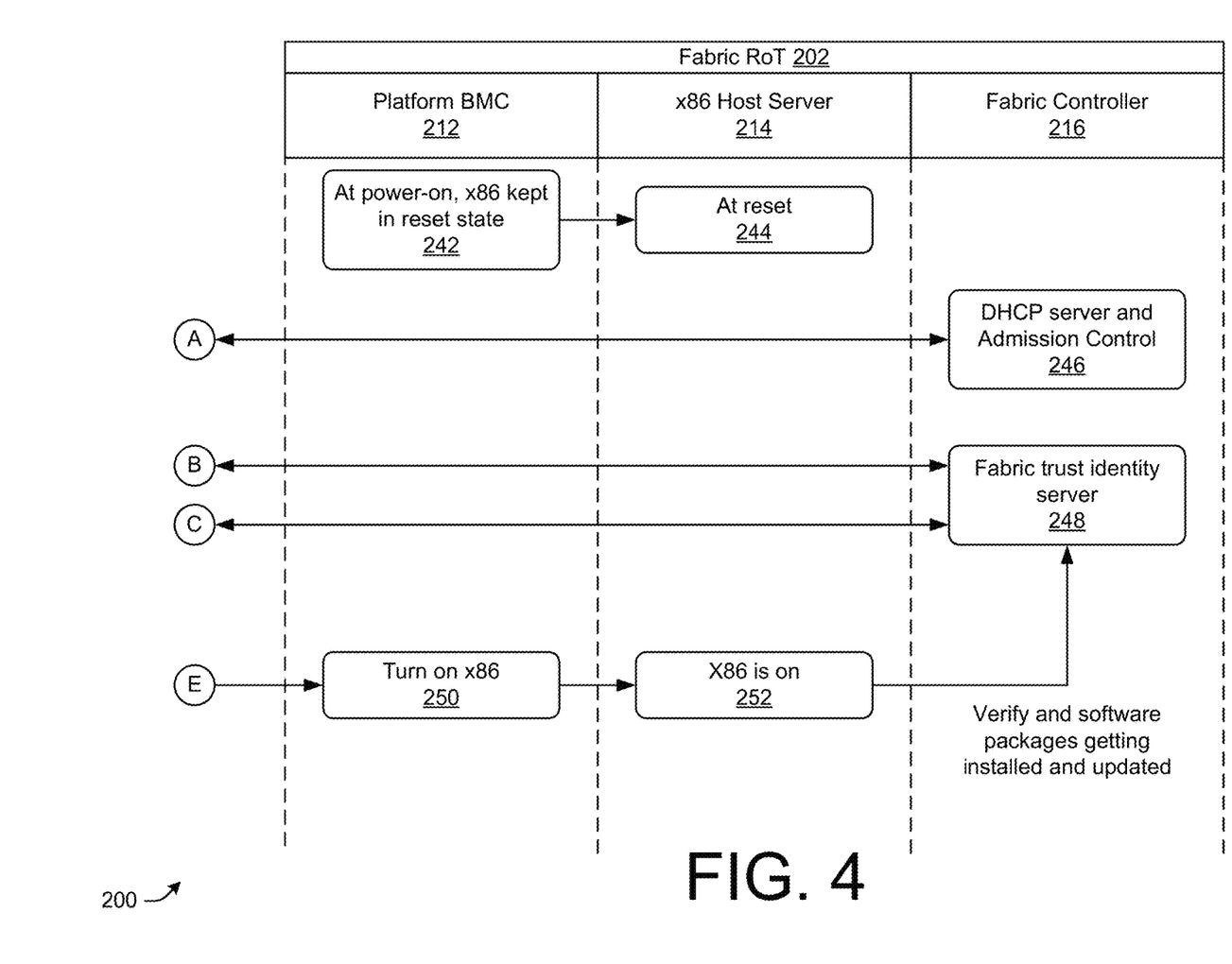

FIGS. 2 through 4 illustrates a flow diagram of an example method 200 of creating a root-of-trust (RoT) within the network fabric 100, according to an example of the principles described herein. The fabric RoT 202 may be created via the interaction of a number of different devices described herein including a NIC BMC 204 (e.g., SNIC BMC 104, FIG. 1), a NIC ARM Trust Zone 206, a number of NIC ARM cores 208 (e.g., DPU ARM core(s) 114, FIG. 1), a NIC vault 210 (e.g., secure vault 106, FIG. 1), a platform BMC 212 (e.g., platform BMC 120, FIG. 1), an x86 host server 214 (e.g., host device 122, FIG. 1), and a fabric controller 216. The method 200 of FIGS. 2 through 4 may include, at 218, powering on the NIC BMC 204 and verifying firmware of the NIC ARM trust zone. Verification of the NIC ARM trust zone may occur immediately as the first processing the NIC BMC 204 performs. Verification of the NIC ARM trust zone may include determining whether the NIC vault 210 has been tampered with either physically or via associated software or firmware.

In one example, the SNIC 102 which includes the NIC BMC 204 may be produced by a third party vendor or other group or individual. In this example, the third party vendor may participate in factory provisioning of the NIC vault 210. In one example, the NIC vault 210 may be hard partitioned into multiple security domains where each domain may be implemented by a disjoint set of hardware components as described above. Again, these multiple security domains may include, for example, an ARM trust zone domain, an ARM core domain, an x86 infrastructure domain, and a user domain. Each domain may provide a separate hardware electronic fuse (eFuse) programming and buses may be connected to each domain. As a result of this physical layout, the domains may be free from any kind of side channel attacks. Further, the layout of these eFuses allows for security domains to be kept separate. As a result, even if one of the domains is hacked, other domains can remain operational. The use of these multiple domains may be beneficial for a number of use cases and examples described herein. An example, board layout is depicted in FIG. 1.

A BMC is the device that controls the power up sequence on a host device such as a server. In one example, once power is turned on, both the platform BMC 212 and the NIC BMC 204 (e.g., SNIC BMC 104) may power up. In examples not directed to the present systems and methods, the platform BMC 212 may be responsible for powering up the x86 host server 214. In contrast, the present systems and methods, the platform BMC 212 will not boot up the x86 host server 214, and the x86 host server 214 will be kept in a reset state unless instructed by the NIC BMC 204 to boot it up. The duration of this reset allows for the NIC BMC 204 (e.g., SNIC BMC 104) to boot up the NIC (e.g., SNIC 102, FIG. 1) to ensure that the RoT is established, decide on an appropriate image for the x86 host server 214 to boot with, and then allow for x86 host server 214 to boot up. Thus, as depicted in FIG. 4, at 242 and at power on of the SNIC 102 or any element of the SNIC 102, the platform BMC 212 keeps the x86 host server 214 in a reset state with the x86 host server 214 at 244 being at reset. As will be described in more detail below, this reset state may change as the SNIC 102 instructs the platform BMC 212 to power on the x86 host server 214.

At 220, the NIC BMC 204, at the NIC ARM trust zone 206, verifies the NIC control plane and the NIC data plane software and/or firmware using keys stored in the NIC vault 210 (e.g., secure vault 106). Thus, the NIC BMC 204 may read keys from the NIC vault 210 including a first eFuse as indicated at 226. In one example, a number of electronic fuses (eFuses) may be utilized within the NIC vault 210. An eFuse may include a microscopic fuse put into a computer chip associated with the NIC vault 210 to allow for dynamic, real-time reprogramming of chips. In contrast to computer logic that is generally "etched" or "hard-wired" onto a chip and cannot be changed after the chip has finished being manufactured, by utilizing a set of eFuses, a chip manufacturer may allow for the circuits on a chip to change while it is in operation. Further, in one example, an eFuse may be provided for each of the ARM trust zone domain, the ARM core domain, the x86 infrastructure domain, and the user domain. Due to the physical layout of the NIC (e.g., SNIC 102, FIG. 1), these domains are free from any kind of side channel attacks and the layout of the eFuses allows for security domains to be kept separate. As a result, even if one of the domains if compromised, the remaining domains may remain operational.

In one example, the secure vault 106 may include keys used to verify the ARM trust zone domain, keys to verify and/or boot up the NIC ARM cores 208, and keys to verify and/or enable the x86 infrastructure, among other keys that may be utilized in association with other domains or devices that may be included within the network fabric 100. Further, in one example, the secure vault 106 may include keys associated with other user-related security needs such as, for example, updating applications executed on the x86 host server 214 (e.g., host device 122). Thus, in this manner, the secure vault 106 may include a number of partitions that provide secure verification and permission via a number of keys. Further, the partitioning of the secure vault 106 may provide for the separation of different security domains.

At 222, the NIC BMC 204 may determine if the software and/or firmware of the NIC (e.g., SNIC 102, FIG. 1) has been verified. In response to a determination that the software and/or firmware of the NIC has not been verified (222, determination NO), then the method 200 may loop back to 220 where the verification is performed again until such verification is achieved. However, in response to a determination that the software and/or firmware of the NIC has been verified (222, determination YES), then the method 200 may proceed to 224.

At 224, after the software and/or firmware of the NIC (e.g., SNIC 102, FIG. 1) has been verified, the software and/or firmware of the NIC (e.g., SNIC 102, FIG. 1) may be further verified as to the NIC ARM core 208. In verifying at 224, the NIC BMC 204 may read keys from the NIC vault 210 as indicated at 228 in a manner similar to the verification performed at 220 and 226 described herein.

Further, at 224, the NIC may be booted up by the NIC BMC 204 and a dynamic host configuration protocol (DHCP) request is sent from the NIC ARM core 208 to the fabric controller 216 including a DHCP server and/or an admission control module in order to allow the NIC and/or the NIC ARM core 208 to communicate within the network fabric 100 and with other networks. The fabric controller 216 may receive the DHCP request at 246 and assign the NIC ARM core 208 an IP address or an IPv6 address after the admission control module has determined that the keys read from the second eFuse at 228 are valid. In one example, the present systems and methods may be agnostic to an IP address or an IPv6 address obtained via DHCP or DHCPv6 protocols, respectively. The DHCP server of the fabric controller 216, at 246, may then send the assigned IP address or IPv6 address to the NIC ARM core 208.

At 230, the NIC BMC 204 and/or the NIC ARM core 208 may determine whether or not the NIC ARM core 208 and NIC (e.g., SNIC 102, FIG. 1) has been assigned and received the IP address or the IPv6 address. In response to a determination that the NIC ARM core 208 has not been assigned and received the IP address or the IPv6 address (230, determination NO), then the method 200 may loop back to 224 and 246 where the DHCP request is sent again until an IP address or an IPv6 address is assigned. However, in response to a determination that the NIC ARM core 208 has been assigned and received the IP address or the IPv6 address (230, determination YES), then the method 200 may proceed to 232.

At 234, the NIC ARM core 208 may boot up the NIC software and/or firmware and the x86 software and/or firmware may be verified. At 232, the identity of the NIC and/or NIC ARM core 208 may verified as to the fabric controller 216 by sending a request to an identity controller such as a fabric trust identity server within the fabric controller 216 at 248. The fabric trust identity server may verify the identity of the NIC and/or NIC ARM core 208 based on the IP address or the IPv6 address obtained from the DHCP server and/or the keys read from the second eFuse at 228.

During this verification at 234, the NIC (e.g., SNIC 102, FIG. 1) and/or NIC ARM core 208 may request an appropriate x86 image used to execute on the x86 host server 214 (e.g., the host device 122, FIG. 1). In one example, the images may be locally stored at the NIC (e.g., SNIC 102, FIG. 1) such as in, for example, an embedded multimedia card (eMMC) flash device of a DPU of the NIC. The appropriate image may be determined by any device within the network fabric 100 including the NIC (e.g., SNIC 102, FIG. 1) and/or other devices such as a router, a switch, fabric controller 216, a server, etc. The appropriate x86 image may be identified by allowing the NIC (e.g., SNIC 102, FIG. 1), NIC BMC 204, and/or the NIC ARM core 208 to have access to the x86 host server 214 (e.g., host device 122, FIG. 1) in order to image the x86 host server 214 without involving the x86 host server 214 and storing that image in the eMMC flash device.

Further, in one example, at 234, the NIC (e.g., the SNIC 102, FIG. 1) may ensure that if any upgrades are needed for the software and/or firmware of both the NIC (e.g., the SNIC 102, FIG. 1) and the x86 host server 214 (e.g., the host device 122, FIG. 1), the NIC may update images accordingly and perform attestation of the software and firmware. Thus, the NIC (e.g., the SNIC 102, FIG. 1) may upgrade and reimage software and/or firmware of the the x86 host server 214 (e.g., the host device 122, FIG. 1) within the NIC securely.

Still further, at 234, after an identity server such as the fabric trust identity server of the fabric controller 216 validates the identity of the x86 host server 214 (e.g., host device 122), the NIC ARM cores 208 (e.g., DPU ARM cores 114, FIG. 1) may collect inventory of a number of FRU components in the x86 host server 214 (e.g., the host device 122, FIG. 1) and verify the FRUs with the fabric trust identity server at 248.

After FRU verification is completed at 234, it may be determined whether the x86 host server 214 (e.g., host device 122, FIG. 1) has been verified at 236. In response to a determination that the x86 host server 214 (e.g., host device 122, FIG. 1) has not been verified, then the method 200 may loop back to 234 and 248 where the verification of 234 may be performed until the verification is made. In response to a determination that the x86 host server 214 (e.g., host device 122, FIG. 1) has been verified, then the method 200 proceed to 238.

At 238 the NIC ARM cores 208 (e.g., DPU ARM cores 114, FIG. 1) may request the NIC BMC 204 (e.g., SNIC BMC 104, FIG. 1) to power on the x86 host server 214 (e.g., the host device 122, FIG. 1). At 240, the NIC BMC 204 may, in turn, request the platform BMC 212 (e.g., platform BMC 120, FIG. 1) to turn on the x86 host server 214. At 250, the x86 host server 214 is instructed by the platform BMC 212 to turn on, and, at 252, the x86 host server 214 is on. Once power is provided to the x86 host server 214, the x86 host server 214 may boot from the eMMC flash device of the NIC (e.g., SNIC 102, FIG. 1) with an appropriate image as selected by the NIC.

In one example, booting up of the x86 host server 214 may include executing an x86 operating system (OS) and infrastructure services. At 248, any other software packages installed or being updated on the x86 host server 214 may be verified by the fabric trust identity server at 248. Further, in the case of updating the software the updating software may be attested to by the fabric trust identity server. Such an attestation may take place in a similar manner for any future FRU installations. Further, the present systems and methods may provide for periodic authentication messages to be exchanged between the NIC (e.g., SNIC 102, FIG. 1) and the platform BMC 212 to ensure that tampering via hot-plug or some other means has not occurred.

The systems and methods described herein are described in the context of in-band network management. However, like the in-band management described herein, the same level of trust may be achieved by moving out-of-band management to the NIC BMC 204 (e.g., SNIC BMC 104, FIG. 1). This out-of-band management may be provided via the sideband management device 108 included in the SNIC 102.

Figure 5:
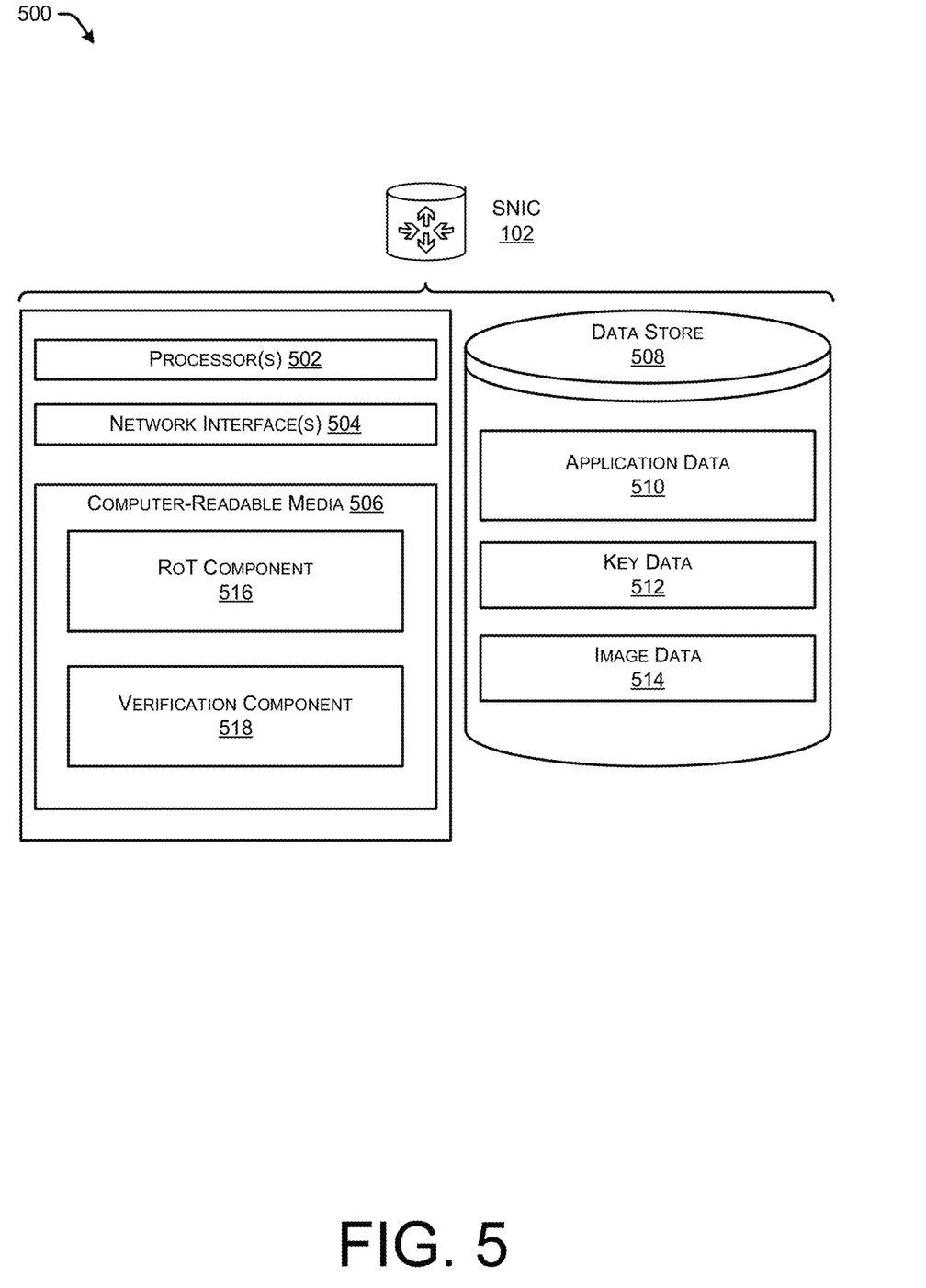
FIG. 5 is a component diagram of example components of a smart network interface card (SNIC), according to an example of the principles described herein.

FIG. 5 is a component diagram 500 of example components of a smart network interface card (SNIC) 102, according to an example of the principles described herein. As illustrated, the SNIC 102 may include one or more hardware processor(s) 502 configured to execute one or more stored instructions. The processor(s) 502 may comprise one or more cores. Further, the SNIC 102 may include one or more network interfaces 504 configured to provide communications between the SNIC 102 and other devices, such as devices associated with the system architecture of FIG. 1 including the platform BMC 120, the host device 122, and/or other systems or devices associated with the SNIC 102 and/or remote from the SNIC 102. The network interfaces 504 may include devices configured to couple to network fabrics, personal area networks (PANs), wired and wireless local area networks (LANs), wired and wireless wide area networks (WANs), and so forth. For example, the network interfaces 504 may include devices compatible with the SNIC 102, the platform BMC 120, the host device 122 and/or other systems or devices associated with the SNIC 102.

The SNIC 102 may also include computer-readable media 506 that stores various executable components (e.g., software-based components, firmware-based components, etc.). In one example, the computer-readable media 506 may include, for example, working memory, random access memory (RAM), read only memory (ROM), and other forms of persistent, non-persistent, volatile, non-volatile, and other types of data storage. In addition to various components discussed herein, the computer-readable media 506 may further store components to implement functionality described herein. While not illustrated, the computer-readable media 506 may store one or more operating systems utilized to control the operation of the one or more devices that comprise the SNIC 102. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the SNIC 102 may include a data store 508 which may comprise one, or multiple, repositories or other storage locations for persistently storing and managing collections of data such as databases, simple files, binary, and/or any other data. The data store 508 may include one or more storage locations that may be managed by one or more database management systems. The data store 508 may store, for example, application data 510 defining computer-executable code utilized by the processor 502 to execute a number of applications described herein. Further, the application data 510 may include key data 512 related to the keys stored within the secure vault 106. In one example, the secure vault 106 and the keys stored therein may be included as part of the data store 508. Further, the data store may store image data 514 defining a number of images of the host device 122.

The computer-readable media 506 may include portions, or components, of software and/or firmware that may be executed to bring about the systems and methods described herein. For example, the computer-readable media 506 may include a root-of-trust (RoT) component 516 to, when executed by the processor(s) 502, move a RoT of a host device 122 to an underlying ubiquitous network fabric 100 by instructing the SNIC BMC 104 to handle the process of booting up the SNIC 102, verifying the SNIC 102 as to the network fabric 100, obtaining an IP address or an IPv6 address for the SNIC 102, verifying the host device 122 as to a fabric controller 216, instruct the platform BMC 120 to power on and boot up the host device 122, and select an appropriate image for booting the host device 122, among other processes described herein. The RoT component 516 may include all or a portion of the executable code associated with the SNIC 102 and may be executed to bring about the functionality of the SNIC 102 as described herein.

The computer-readable media 506 may further include a verification component 518 to, when executed by the processor(s) 502, verify elements within the SNIC and external to the SNIC with respect to the fabric controller 216. For example, the verification component 518 may verify the SNIC BMC 104 as to the SNIC 102 using the keys include in the secure vault 106, verifying the NIC control plane, verify the NIC as to the fabric controller 216, verify the host device 122 as to the network fabric 100, verify a number of FRU components, and verify software packages that are to be installed or updated on the host device 122, among other processes described herein. The verification component 518 may include all or a portion of the executable code associated with the SNIC 102 and may be executed to bring about the functionality of the SNIC 102 as described herein.

Figure 6:
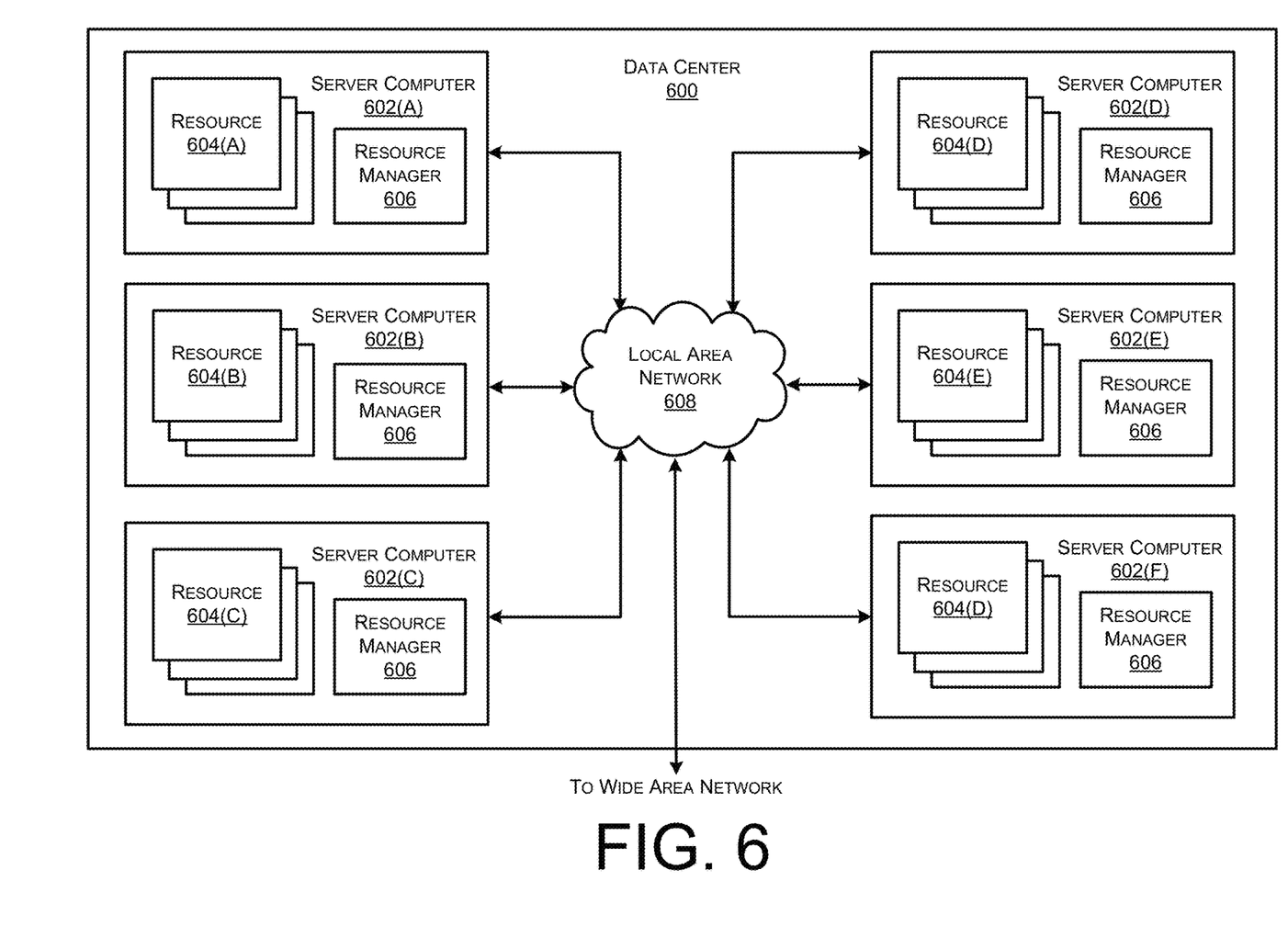
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602) for providing computing resources. In some examples, the resources and/or server computers 602 may include, or correspond to, any type of networked device described herein. Although described as servers, the server computers 602 may comprise any type of networked device, such as servers, switches, routers, hubs, bridges, gateways, modems, repeaters, access points, etc.

The server computers 602 may be standard tower, rackmount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
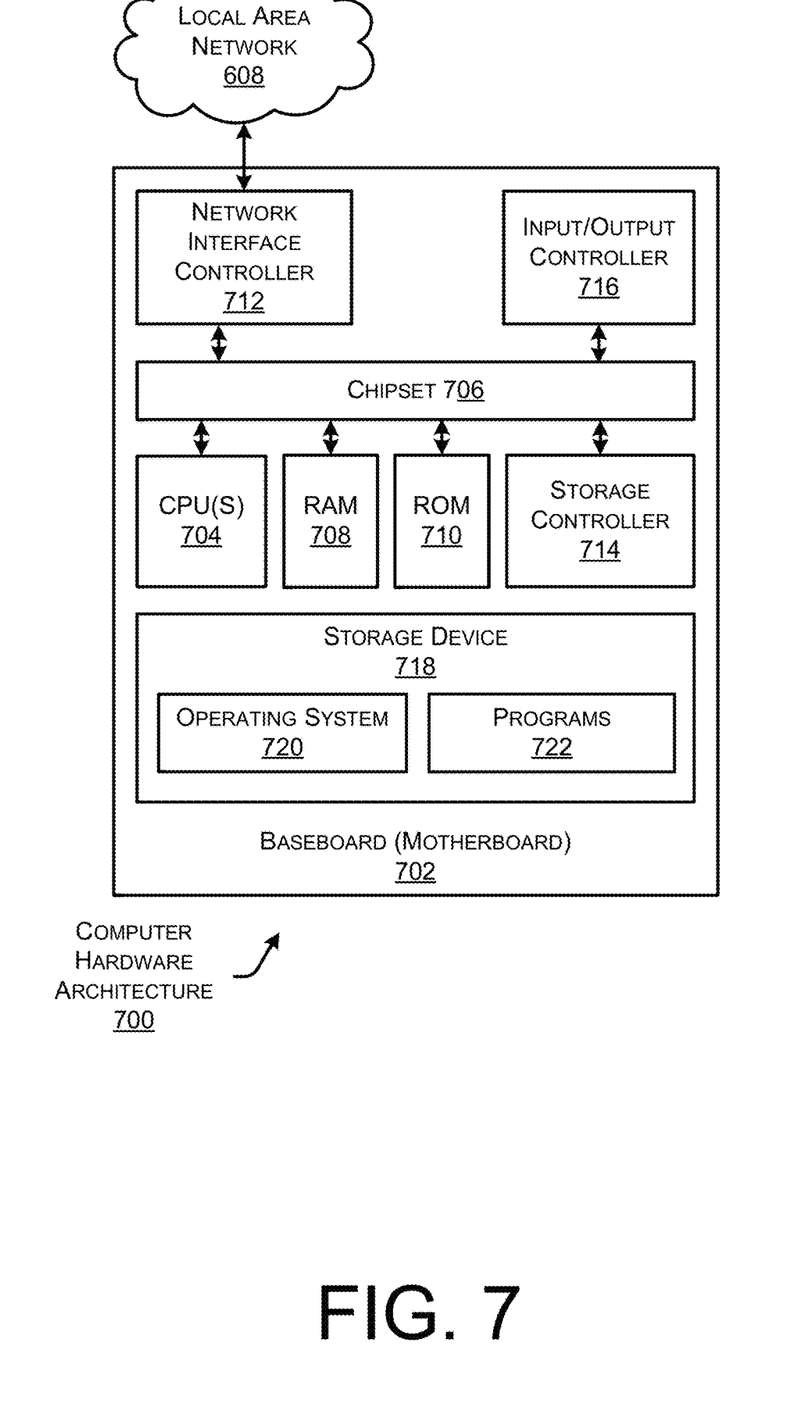
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the SNIC 102, the platform BMC 120, the host device 122, computing devices within the SNIC 102, computing devices within the network fabric 100, and/or other systems or devices associated with the SNIC 102 and/or remote from the SNIC 102, a workstation, a desktop computer, a laptop, a tablet, a network appliance, an e-reader, a smartphone, or other computing device, and may be utilized to execute any of the software components described herein. The computer 700 may, in some examples, correspond to a network device (e.g., the SNIC 102, the platform BMC 120, the host device 122, computing devices within the SNIC 102, computing devices within the network fabric 100) described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the SNIC 102, the platform BMC 120, the host device 122, computing devices within the SNIC 102, computing devices within the network fabric 100, among other devices. The chipset 706 may include functionality for providing network connectivity through a Network Interface Controller (NIC) 712, such as a gigabit Ethernet adapter. The NIC 712 is capable of connecting the computer 700 to other computing devices within the SNIC 102 and external to the SNIC 102. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the SNIC 102, the platform BMC 120, the host device 122, computing devices within the SNIC 102, computing devices within the network fabric 100, and or any components included therein, may be supported by one or more devices similar to computer 700. Stated otherwise, some or all of the operations performed by the SNIC 102, the platform BMC 120, the host device 122, computing devices within the SNIC 102, computing devices within the network fabric 100, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 6. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may comprise one or more of the SNIC 102, the platform BMC 120, the host device 122, computing devices within the SNIC 102, computing devices within the network fabric 100, and/or other systems or devices associated with the SNIC 102 and/or remote from the SNIC 102. The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the SNIC 102, the platform BMC 120, the host device 122, computing devices within the SNIC 102, computing devices within the network fabric 100, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for the SNIC 102, the platform BMC 120, the host device 122, computing devices within the SNIC 102, computing devices within the network fabric 100 as described herein. The programs 722 may enable the devices described herein to perform various operations.

CONCLUSION

The examples described herein provide systems and methods to move a root-of trust (RoT) from a host computing device such as, for example, a number of compute servers to an underlying ubiquitous networking fabric. In this manner, a network may utilize a fabric-based RoT providing a trust zone environment for the compute and network elements within the network.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of creating a root-of-trust (ROT) within a network fabric, comprising:
    powering on a network interface card (NIC) baseboard management controller (BMC) (NIC BMC) located on a NIC;
    booting up a NIC via the NIC BMC;
    obtaining an address for the NIC;
    verifying an identity of the NIC at a fabric trust identity server using a key obtained from a secure vault communicatively coupled to the NIC BMC;

verifying with the fabric trust identity server a number of images of a host device residing in the NIC based at least in part on the identity of the NIC being verified; and instructing a platform BMC to boot up the host device based at least in part on the number of images of the host device being verified.

2. The method of claim 1, further comprising authenticating the NIC as to an advanced reduced instruction set computer (RISC) machine (ARM) using the key obtained from the secure vault communicatively coupled to the NIC BMC.

3. The method of claim 2, further comprising instructing the NIC, with the NIC BMC, to boot up a number of ARM cores associated with the ARM.

4. The method of claim 1, further comprising provisioning the number of images of the host device for execution on the host device.

5. The method of claim 1, wherein the secure vault comprises a System-on-Chip (SoC) electrical programmable fuse (eFuse).

6. The method of claim 1, wherein the key of the secure vault is secured within the secure vault at a time of manufacture.

7. The method of claim 1, wherein the platform BMC maintains the host device in a reset state until the NIC BMC instructs the platform BMC to boot up the host device.

8. The method of claim 1, further comprising periodically exchanging an authentication message between the NIC BMC and the platform BMC to ensure that tampering of the platform BMC has not occurred.

9. A non-transitory computer-readable medium storing instructions that, when executed, causes a processor to perform operations, comprising:

powering on a network interface card (NIC) baseboard management controller (BMC) (NIC BMC) located on a NIC;

booting up a NIC via the NIC BMC;

obtaining an address for the NIC;

verifying an identity of the NIC at a fabric trust identity server using a key obtained from a secure vault communicatively coupled to the NIC BMC;

verifying with the fabric trust identity server a number of images of a host device residing in the NIC based at least in part on the identity of the NIC being verified; and instructing a platform BMC to boot up the host device based at least in part on the number of images of the host device being verified.

10. The non-transitory computer-readable medium of claim 9, the operations further comprising authenticating the NIC as to an advanced reduced instruction set computer (RISC) machine (ARM) using the key obtained from the secure vault communicatively coupled to the NIC BMC.

11. The non-transitory computer-readable medium of claim 10, the operations further comprising instructing the NIC, with the NIC BMC, to boot up a number of ARM cores associated with the ARM.

12. The non-transitory computer-readable medium of claim 9, the operations further comprising provisioning the number of images of the host device for execution on the host device.

13. The non-transitory computer-readable medium of claim 9, wherein the secure vault comprises a System-on-Chip (SoC) electrical programmable fuse (eFuse).

14. The non-transitory computer-readable medium of claim 9, wherein the key of the secure vault is secured within the secure vault at a time of manufacture.

15. The non-transitory computer-readable medium of claim 9, wherein the platform BMC maintains the host device in a reset state until the NIC BMC instructs the platform BMC to boot up the host device.

16. The non-transitory computer-readable medium of claim 9, the operations further comprising periodically exchanging an authentication message between the NIC BMC and the platform BMC to ensure that tampering of the platform BMC has not occurred.

17. A computing device comprising:

a processor; and a non-transitory computer-readable media storing instructions that, when executed by the processor, causes the processor to perform operations comprising:

powering on a network interface card (NIC) baseboard management controller (BMC) (NIC BMC) located on a NIC;

booting up a NIC via the NIC BMC;

obtaining an address for the NIC;

verifying an identity of the NIC at a fabric trust identity server using a key obtained from a secure vault communicatively coupled to the NIC BMC;

verifying with the fabric trust identity server a number of images of a host device residing in the NIC based at least in part on the identity of the NIC being verified; and instructing a platform BMC to boot up the host device based at least in part on the number of images of the host device being verified.

18. The computing device of claim 17, the operations further comprising:

authenticating the NIC as to an advanced reduced instruction set computer (RISC) machine (ARM) using the key obtained from the secure vault communicatively coupled to the NIC BMC;

instructing the NIC, with the NIC BMC, to boot up a number of ARM cores associated with the ARM;

provisioning the number of images of the host device for execution on the host device.

19. The computing device of claim 17, wherein the NIC is a smart NIC (SNIC).

20. The computing device of claim 17, the operations further comprising periodically exchanging an authentication message between the NIC BMC and the platform BMC to ensure that tampering of the platform BMC has not occurred.

* * * * *